US005607615A

United States Patent [19]
Taguchi et al.

[11] Patent Number: 5,607,615
[45] Date of Patent: Mar. 4, 1997

[54] HEXAGONAL BA-FERRITE SINTERED MAGNET, ITS MAKING METHOD, AND POLAR ANISOTROPY RING MAGNET

[75] Inventors: Hitoshi Taguchi, Chiba; Fumihiko Hirata, Shizuoka; Taku Takeishi; Teruo Mori, both of Chiba, all of Japan

[73] Assignee: TDK Corporation, Tokyo, Japan

[21] Appl. No.: 439,551

[22] Filed: May 11, 1995

[30] Foreign Application Priority Data

May 13, 1994 [JP] Japan .................................. 6-124186

[51] Int. Cl.⁶ .................................................. H01F 1/04
[52] U.S. Cl. ............................ 252/62.63; 252/62.62; 252/62.59
[58] Field of Search .......................... 252/62.63, 62.62, 252/62.59

[56] References Cited

U.S. PATENT DOCUMENTS 4,457,851   7/1984   Tabaru et al. .......................... 252/62.63

FOREIGN PATENT DOCUMENTS

| 489297 | 2/1973 | Japan . | |
|---|---|---|---|
| 5626769 | 3/1981 | Japan . | |
| 58-9303 | 1/1983 | Japan ................... | 252/62.63 |
| 59-138313 | 8/1984 | Japan . | |
| 3291901 | 12/1991 | Japan . | |
| 45802 | 1/1992 | Japan . | |

OTHER PUBLICATIONS

J. Appl. Phys., vol. 44, No. 7, pp. 3300–3305, Jul. 1973, R. H. Arendt, "Liquid–Phase Sintering of Magnetically Isotropic and Anisotropic Compacts of $BaFe_{12}O_{19}$ and $SrFe_{12}O_{19}$".
Journal of the American Ceramic Society, vol. 56, No. 4, pp. 207–211, Apr. 1973, J. S. Reed, et al., "Characterization and Sintering Behavior of BA and SR Ferrites".
Ber. Dt. Keram. Ges., vol. 55, No. 6, pp. 301–304, 1978, Franciscus Kools, "Effect of Silica During Sintering of M–Type Ferrites".
"Effect of Additives on Magnetic Properties of Strontium Ferrite Magnets", vol. 3, pp. 29–35, Jan. 1977, Atsushi Hamamura.
"Influence of Addition of Some Oxides on the Magnetic Properties of the Strontium Ferrite Magnets", vol. 52, No. 4, pp. 151–159, 1977, Takeshi Anbo, et al.

*Primary Examiner*—Melissa Bonner
*Attorney, Agent, or Firm*—Oblon, Spivak, McClelland, Maier & Neustadt, P.C.

[57] ABSTRACT

In a method for preparing a magnet by pulverizing a calcined powder of hexagonal barium ferrite, compacting the thus pulverized ferrite magnet source particles in a magnetic field, and sintering the compact, a structure comprising barium ferrite as a primary phase and containing strontium and silicon as grain boundary components is obtained when a silicon component such as $SiO_2$ and a strontium component such as $SrCO_3$ are contained in the compact. This results in a hexagonal barium ferrite sintered magnet which has minimal anisotropy of shrinkage factor and minimal deformation during sintering, requires only simple or no post-polishing, and has improved sintered density and coercivity.

18 Claims, 8 Drawing Sheets

Br AND iHc VERSUS
AMOUNT OF SrCO$_3$ ADDED

HEXAGONAL BA-FERRITE SINTERED MAGNET, ITS MAKING METHOD, AND POLAR ANISOTROPY RING MAGNET

BACKGROUND OF THE INVENTION

1. Technical Field

This invention relates to a hexagonal barium ferrite magnet, method for preparing the same, and a polar anisotropy ring magnet.

2. Background Art

Currently, hexagonal strontium and barium ferrites of the magnetoplumbite type (M type) are mainly used as oxide permanent magnet materials and they are manufactured into sintered magnets and bonded magnets. Strontium or barium ferrite sintered magnets are prepared by blending and mixing $Fe_2O_3$ and $SrCO_3$ or $BaCO_3$ source materials, calcining, pulverizing, compacting in a magnetic field, and firing. In the process, it is a common practice to add $CaCO_3$ and $SiO_2$ together as shown in Examples of JP-A 291901/1991 and 5802/1992, for example.

Hexagonal barium ferrite is advantageous in reducing manufacture cost because $BaCO_3$ used as the source material is less expensive than $SrCO_3$ for strontium ferrite. However, hexagonal barium ferrite sintered magnets are less likely to offer high coercivity (iHc) since their crystal magnetic anisotropy is about 10% less than that of strontium ferrite. Therefore, hexagonal strontium ferrite sintered magnets are used in products which require iHc of at least 3 kOe, for example.

On the other hand, when $CaCO_3$ and $SiO_2$ are added together during preparation of strontium or barium ferrite sintered magnets as in the prior art, the shrinkage factor during sintering is significantly different between c and a axis directions, with their ratio of c axis direction/a axis direction ranging from about 1.5 to about 2.1. As a result, shrinkage during sintering causes substantial deformation, which imposes the necessity to design the mold by previously taking into account a deformation amount or to carry out substantial post-working like polishing and machining, for example, resulting in an increase of manufacture cost.

Figure 7A:
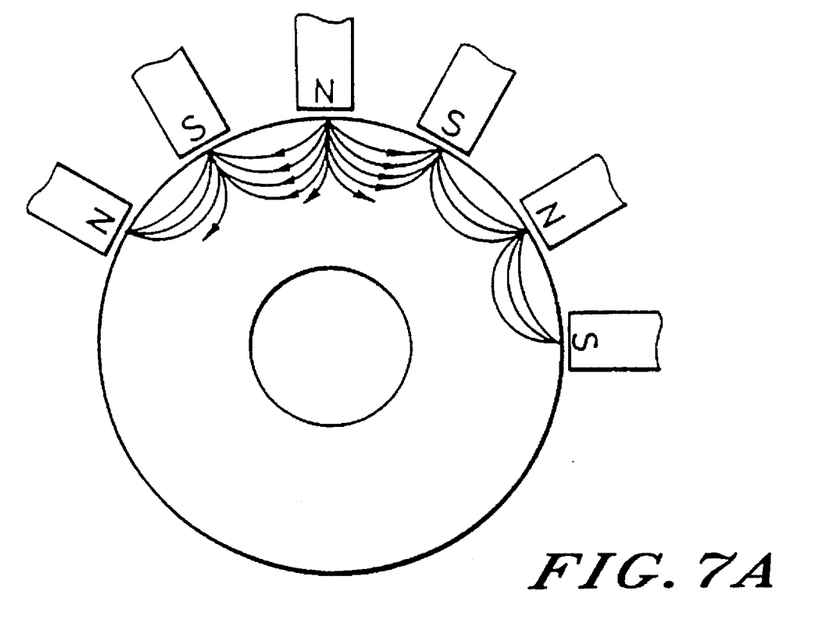
FIGS. 7(a) and 7(b) are plan views illustrating prior art polar anisotropy ring magnets.
Figure 7B:
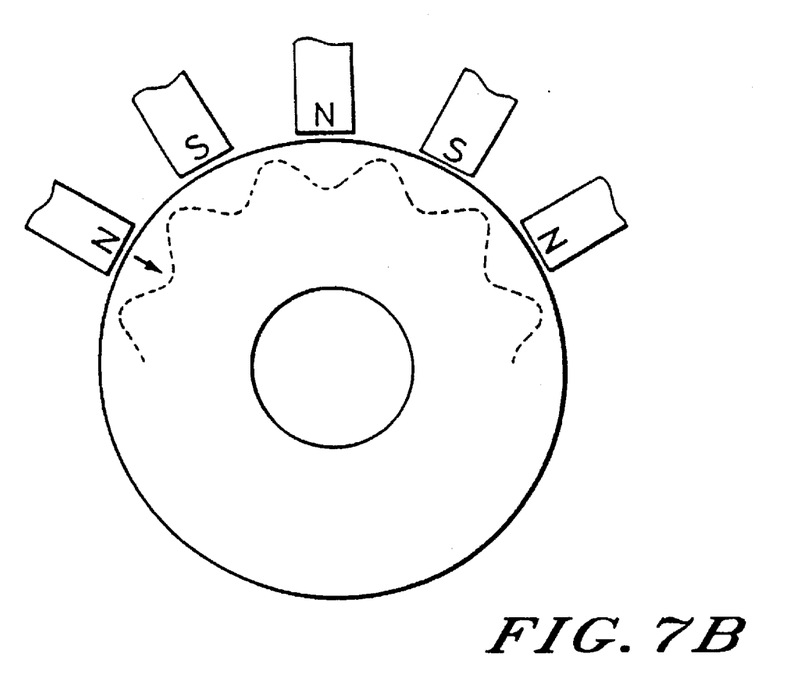

A polar anisotropy ring magnet is known as a typical magnet that experiences substantial deformation due to such differential shrinkage factor. This magnet is of ring shape with its inner or outer circumferential surface being strongly magnetized in multiple poles and finds use in stepper motors or the like. In preparing the ring magnet, a ring-like molded body is formed while alternating poles are arranged around its circumferential surface to effect magnetic field orientation for orienting c axis in the direction of an arrow in FIG. 7(a), and it is then sintered. However, since the body has great anisotropy of shrinkage factor as mentioned above, the circumferential surface is deformed as shown by broken lines in FIG. 7(b). Ridges developed on the circumferential surface must be ground away and hence, a substantial grinding allowance must be furnished.

DISCLOSURE OF THE INVENTION

A primary object of the present invention is to provide a hexagonal barium ferrite sintered magnet which has improved sintered density and coercivity, is minimized in deformation during sintering which is otherwise caused by the difference between the shrinkage factors in c and a axis directions, and is simplified in post-treatment like polishing or can omit such post-treatment, a method for preparing the same, and a polar anisotropy ring magnet using the same.

This and other objects are achieved by the present invention, which is defined below as (1) to (15).

(1) A hexagonal barium ferrite sintered magnet comprising barium ferrite as a primary phase and containing strontium and silicon as grain boundary components.

(2) The hexagonal barium ferrite sintered magnet of (1) wherein the grain boundary has a silicon content of 2 to 50 at %.

(3) The hexagonal barium ferrite sintered magnet of (1) wherein the grain boundary has a strontium content of 0.5 to 10 at %.

(4) The hexagonal barium ferrite sintered magnet of (1) wherein the grain boundary has a silicon content which is 2 to 100 times the silicon content within primary phase grains.

(5) The hexagonal barium ferrite sintered magnet of (1) wherein the grain boundary has a strontium content which is 1.1 to 20 times the strontium content within primary phase grains.

(6) The hexagonal barium ferrite sintered magnet of (1) which contains barium as a grain boundary component, the grain boundary has a barium content which is 1.1 to 20 times the barium content within primary phase grains.

(7) The hexagonal barium ferrite sintered magnet of (1) wherein the primary phase has a mean grain size of up to 1.0 µm.

(8) A method for preparing a hexagonal barium ferrite sintered magnet comprising the steps of pulverizing a calcined powder of hexagonal barium ferrite, compacting the thus pulverized barium ferrite source particles in a magnetic field to form a compact, and sintering the compact, the method further comprising incorporating into said compact a silicon component in the form of silicon oxide or a compound capable of converting into silicon oxide upon firing and a strontium component in the form of strontium oxide or a compound capable of converting into strontium oxide upon firing.

(9) A method for preparing a hexagonal barium ferrite sintered magnet according to (8) wherein said silicon component and said strontium component are contained such that the amount of said silicon component is 0.1 to 2.0% by weight calculated as $SiO_2$ and the amount of said strontium component is 0.5 to 5% by weight calculated as $SrCO_3$, both based on the barium ferrite source particles, the molar ratio of $SrCO_3/SiO_2$ being from 0.5 to 3.

(10) A method for preparing a hexagonal barium ferrite sintered magnet according to (8) wherein said silicon component and said strontium component are added together in the pulverizing step.

(11) A method for preparing a hexagonal barium ferrite sintered magnet according to (8) wherein said barium ferrite source particles have a mean particle size of up to 1 µm.

(12) A method for preparing a hexagonal barium ferrite sintered magnet comprising the steps of disintegrating the compact of (8), compacting in a magnetic field and sintering.

(13) A method for preparing a hexagonal barium ferrite sintered magnet according to (8) wherein the sintering step causes barium to precipitate at a grain boundary.

(14) A method for preparing a hexagonal barium ferrite sintered magnet according to (8) wherein the hexagonal barium ferrite sintered magnet of (1) is obtained.

(15) A polar anisotropy ring magnet comprising the hexagonal barium ferrite sintered magnet of (1) which is shaped into a ring having an inner or outer peripheral surface which is oriented in multiple poles.

FUNCTION AND ADVANTAGE

The hexagonal barium ferrite sintered magnet of the present invention has improved sintered density and coercivity. In particular, it has coercivity comparable to that of conventional Sr ferrite while reducing the cost of raw material. Since the ratio of the shrinkage factor in c axis direction to the shrinkage factor in a axis direction (Shc/Sha) is approximate to unity, minimal deformation will occur during sintering so that polishing and other steps may be simplified or omitted. This ensures outstanding advantages upon manufacture of polar anisotropy ring magnets and other magnets requiring special orientation.

BRIEF DESCRIPTION OF THE DRAWINGS

FIG. 2 graphically shows the shrinkage factor (graph a) and shrinkage factor ratio (graph b) versus the amount of $SrCO_3$ added of inventive and comparative hexagonal barium ferrite sintered magnets.

ILLUSTRATIVE CONSTRUCTION

The illustrative construction of the present invention is described in detail.

The hexagonal barium ferrite sintered magnet of the present invention magnet contains a primary phase of hexagonal barium ferrite and preferably has a final composition of $BaO.nFe_2O_3$ wherein n is 4.5 to 6.5. It may further contain Ca, Pb, Al, Ga, Sn, Zn, In, Co, Ni, Ti, Cr, Mn, Cu, Ge, Nb, Zr, Cr, La, Nd, Sm, Pr, Ce, Li, etc. in an amount of up to 5% of the entirety. Also less than 50 at %, for example, 0 to 40 at %, especially 0 to 5 at % of Ba may be replaced by Sr.

The hexagonal barium ferrite sintered magnet of the present invention contains SrO and $SiO_2$ as grain boundary components. The presence of Sr and Si as grain boundary components can be confirmed by various methods, preferably the following first or second method because of ease of quantitative determination, especially the first method because of precise and consistent measurement.

Figure 8:
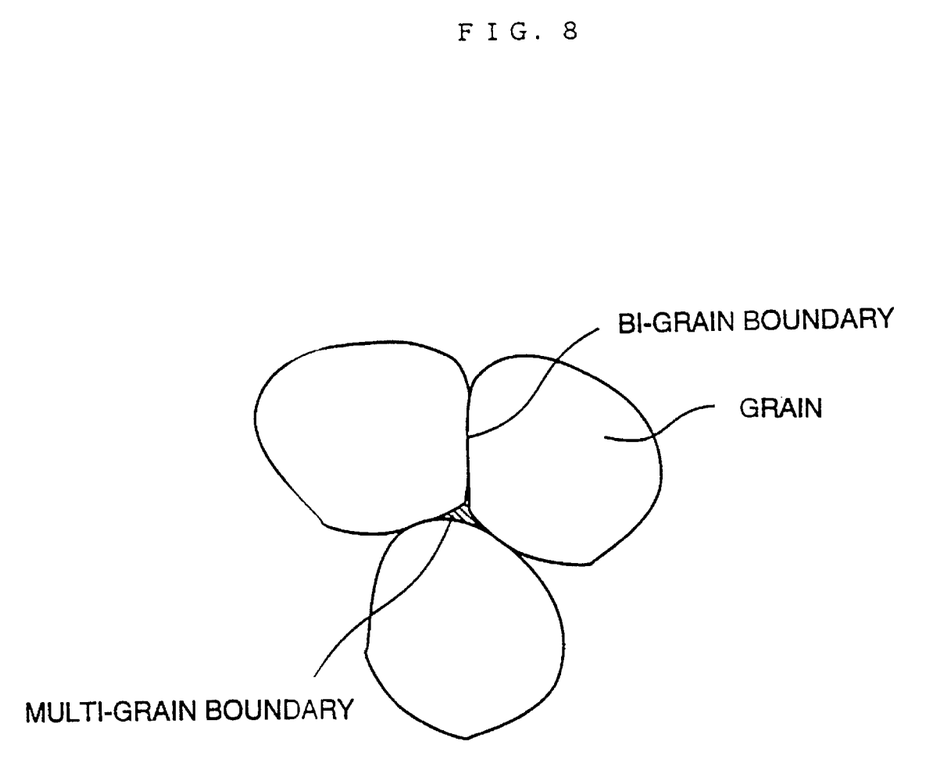
FIG. 8 is a schematic view illustrating a multi-grain boundary.

The first method uses an analytical electron microscope capable of simultaneously performing observation under a transmission electron microscope (TEM) and local analysis by energy dispersive X-ray spectroscopy (EDS). In this method utilizing TEM-EDS, a thin magnet piece prepared by polishing is used as a sample to be measured. A grain boundary phase and a ferrite phase in grains can be readily distinguished in a crystal structure image. The grain boundary phase is not present at a uniform thickness around grains, but concentrated especially at a multi-grain boundary. The multi-grain boundary designates a grain boundary among three or more grains, for example, a grain boundary among three grains (triple point) as shown in FIG. 8. For the composition analysis of a grain boundary, measurement is preferably done at such a multi-grain boundary. Since a bi-grain boundary which appears at a boundary between two grains has a grain boundary phase of reduced thickness, accurate determination of grain boundary components by EDS local analysis is difficult.

It is believed that since the bi-grain boundary is contiguous to the multi-grain boundary, the constituents of both the boundaries are essentially identical. In the case of an anisotropic sintered body having grains oriented wherein the grain boundary includes two types, a and c-plane grain boundaries, measurement may be done along either grain boundary.

The second method is to analyze by electron spectroscopy for chemical analysis (ESCA) or Auger electron spectroscopy (AES). First a magnet is heated and quenched. Quenching is done from about 800° to 1,000° C. at a rate of about 500° to 2,000° C./sec., for example, by cooling in water. The magnet is then cleaved along the grain boundary. A flatter fracture surface is analyzed by ESCA or AES although the ESCA is preferred for spectral separation of elements on analysis. On analysis, the profile of respective elements in a depth direction is measured while effecting ion milling. Although the fracture surface does not always occur across the center of the grain boundary phase, an atomic percent of each element determined from an initial value of its count is the content of that element in the grain boundary because the measurement range of ESCA is about $10^3$ to $10^5$ μm square and atoms are counted as an average over this range. With the progress of ion milling, a constant concentration is reached at a depth of at least 100 to 200 Å and an average value obtained at this point is the content of an element in the interior of the primary phase grain.

The Si content $C_{1o}$ of the grain boundary as determined by either of the above-mentioned methods is preferably 2 to 50 at % and $C_{1o}$ divided by the Si content $C_{1i}$ of the grain interior is preferably from 2 to 100. On the other hand, the Sr content $C_{2o}$ of the grain boundary is preferably 0.5 to 10 at % and $C_{2o}$ divided by the Sr content $C_{2i}$ of the grain interior is preferably from 1.1 to 20.

More illustratively, when the first method is used, the Si content $C_{1o}$ is preferably 2 to 30 at %, especially 5 to 25 at % and $C_{1o}$ divided by $C_{1i}$ is preferably from 2 to 100, especially from 10 to 80. On the other hand, the Sr content $C_{2o}$ is preferably 0.5 to 8 at %, especially 1 to 4 at % and $C_{2o}$ divided by $C_{2i}$ is preferably from 1.1 to 20, especially from 3 to 15.

When the second method is used, the Si content $C_{1o}$ is preferably 2 to 30 at %, especially 5 to 20 at % and $C_{1o}$ divided by $C_{1i}$ is preferably from 2 to 50, especially from 4 to 20. On the other hand, the Sr content $C_{2o}$ is preferably 1 to 5 at %, especially 2 to 4 at % and $C_{2o}$ divided by $C_{2i}$ is preferably from 1.1 to 5, especially from 1.2 to 3.

In addition to Si and Sr, the magnet of the present invention generally contains Ba as a grain boundary component. The grain boundary component used herein designates an element having a higher concentration at the grain boundary than in the grain interior. Although Ba is a main component of grains, the magnet of the invention has Ba precipitated at the grain boundary as a result of sintering so that the Ba concentration at the grain boundary is higher than the Ba concentration in the grain interior. More particularly, the Ba content $C_{3o}$ of the grain boundary divided by the Ba content $C_{3i}$ in the grain interior is from 1.1 to 20, especially from 1.5 to 5. It is noted that $C_{3o}$ and $C_{3i}$ are measurements by the first method. In conventional barium ferrite sintered magnets which do not contain Si and Sr as grain boundary components, the Ba concentration at the grain boundary is equal to the Ba concentration in the grain interior, indicating that a barium ferrite magnet having the above-mentioned barium distribution is not known in the prior art.

The magnet having the above-mentioned profile as analyzed by ESCA is improved especially in iHc and has a shrinkage factor ratio close to unity. It is to be noted that on measurement by ESCA, the average thickness of the grain boundary phase is twice the distance at which a constant concentration is reached on analysis in a depth direction and that thickness is generally 20 to 300 Å, especially 40 to 200 Å. Also the primary phase has a mean grain size of up to 1 μm, especially about 0.5 to 1.0 μm. The grain size is determined by means of a scanning electron microscope (SEM).

Such barium ferrite sintered magnets generally have an iHc of at least 2.5 kOe, in a preferred embodiment an iHc of at least 3 kOe, especially 3.4 to 4.0 kOe. As compared with the iHc of conventional magnets having Ca and Si added together, an improvement of about 10 to 25% is accomplished with the same additive content. It is noted that Br is about 4.1 to 4.4 kG. The ratio of shrinkage factor in c axis direction to shrinkage factor in a axis direction (Shc/Sha) is from 0.8 to 1.5, especially from 0.9 to 1.2.

Such hexagonal barium ferrite sintered magnets are prepared by first pulverizing calcined powder of hexagonal barium ferrite, compacting the thus pulverized barium ferrite powder particles as source particles in a magnetic field, and sintering the resulting compact. At this point, a Si component in the form of silicon oxide or a compound capable of converting into silicon oxide upon firing and a Sr component in the form of strontium oxide or a compound, capable of converting into strontium oxide upon firing are contained in the compact. The amount of the Si component is preferably 0.1 to 2.0 wt %, more preferably 0.2 to 1.5 wt %, especially 0.3 to 1.0 wt % calculated as $SiO_2$ based on the barium ferrite source particles. The amount of the Sr component is preferably 0.5 to 5 wt %, more preferably 1.0 to 2.5 wt %, especially 1.2 to 2.2 wt % calculated as $SrCO_3$ based on the barium ferrite source particles. The molar ratio of $SrCO_3/SiO_2$ is preferably from 0.5 to 3, more preferably from 0.7 to 2.5, especially from 0.9 to 2.0. By adding these components within these ranges, iHc is further improved and the shrinkage factor in c axis direction becomes substantially equal to the shrinkage factor in a axis direction.

The Si component forms nuclei for grain boundary glass components. More than the above-defined range of the Si component will add to a non-magnetic vitreous phase, detracting from Br. Below the above-defined range, grain growth upon firing becomes uncontrollable, detracting from iHc.

Whether the amount of Sr component and the $SrCO_3/SiO_2$ ratio are above or below the above-defined range, there result a lowering of iHc and an increase of shrinkage factor ratio (Shc/Sha etc.).

The calcined powder of hexagonal barium ferrite used in the practice of the invention is obtained by mixing predetermined amounts of iron oxide powder and barium-containing powder as powder sources and calcining the mixture. The barium-containing powder is not critical as long as it is an oxide or a compound capable of converting into an oxide upon firing, such as carbonate salts, hydroxides, and nitrate salts. Most often a carbonate salt may be used. No special limit is imposed on the mean particle size although iron oxide should preferably be of finely divided powder, typically primary particles of up to 1 μm, especially up to 0.5 μm. In the practice of the invention, Ca, Sr, Pb, La, Nd, Sm, Pr, Ce, Al, Ga, Cr, Sn, Zn, In, Co, Ni, Ti, Cr, Mn, Cu, Ge, Nb, Zr, Li, Si, etc. may be further added to the above-mentioned powder sources if necessary.

In order to obtain very fine ferrite particles after calcining, mixing may be done, for example, by first subjecting the iron oxide to wet grinding and adding an aqueous solution of a water-soluble salt of Ba thereto in the presence of $Na_2CO_3$ or the like. Then a carbonate salt of Ba is precipitated and mixed with fine iron oxide particles to high precision. Alternatively, a fine carbonate salt of Ba may be used and thoroughly mixed with iron oxide. Subsequent steps are washing, drying, and calcining. Calcining may be effected in air, for example, at 1,000° to 1,350° C. for about 1 second to about 10 hours, especially about 1 second to about 3 hours. It is also acceptable to thoroughly grind and mix the source materials in a dry grinding machine.

Also the calcined powder may be obtained by grinding and mixing iron oxide powder and barium-containing powder as source materials, heat treating the mixture under such conditions that an intermediate phase consisting of Ba-richer oxide than the calcined powder composition (e.g., $BaFe_2O_4$ and $BaFeO_{3-x}$ wherein $0 \leq x < 1$) may be created, further grinding the mixture containing the intermediate phase, and calcining it.

The thus obtained calcined powder has a ferrite structure of substantially the magnetoplumbite type, with its primary particles preferably having a mean particle size of 0.1 to 1 μm, especially 0.1 to 0.5 μm. The particle size may be determined by means of a scanning electron microscope (SEM). It preferably has a saturation magnetization σs of 65 to 69 emu/g and a coercive force iHc of 4,000 to 6,000 Oe.

Next, the calcined powder is pulverized. Although the present invention requires that the Si and Sr components be added in the above-defined range, it is satisfactory if these components be present prior to magnetic field compaction. Then their addition stage may be at any stage from pulverization of the calcined powder to compaction. Preferably they are added during pulverization of the calcined powder, especially at an initial stage of the pulverization step. The Si component is generally $SiO_2$. The Sr component is generally $SrCO_3$. Also compounds with Si may be used. When they are added in powder form, the particle size is about 0.01 to 5 μm.

In the step of pulverizing the calcined powder, crystal strains are preferably introduced into the calcined powder for reducing bHc. If the calcined particles are particulated (into single magnetic domain particles) with resultant increases of iHc and bHc, magnetic forces act between particles to assist in agglomeration of ferrite particles, consequently precluding anisotropy from being induced by a magnetic field. The attractive force (cohesive force) between ferrite particles is proportional to the square of the magnetic flux density at the particle surface. As bHc in a hysteresis loop of one ferrite particle increases, the surface magnetic flux density is greater and consequently, the cohesive force becomes greater. Accordingly, for the purpose of weakening the cohesive force of ferrite particles, it is advantageous to introduce crystal strains to reduce bHc for thereby reducing the squareness in the second quadrant. A higher degree of orientation is then available during magnetic field orientation. The strains introduced into the particles are removed during the firing step after the magnetic field compacting step, resulting in a permanent magnet having high magnetic properties.

The iHc reduction of Ba ferrite particles by the introduction of crystal strains is accompanied by an additional advantage that the change of iHc relative to temperature is reduced. A temperature coefficient of iHc decreases to about 1 to 6 Oe/° C. in the range of −100° C. +150° C. Then the stressed particles as such can also be used as magnetic powder for magnetic recording media.

For introducing such crystal strains, mechanical pulverization is effective. Such pulverization is preferably accomplished, for example, by first performing dry pulverization to introduce sufficient crystal strains. The pulverizing machine used in dry pulverization may be selected from dry vibratory mills, dry attritors (media agitating mills) and dry ball mills, with the dry vibratory mills being preferably used.

Dry pulverization is continued until a BET specific surface area is increased 2 to 10 times, thereby introducing about $3 \times 10^{-4}$ to $7 \times 10^{-4}$ of crystal strains in (206) plane. The powder as dry pulverized has a mean particle size of about 0.1 to 1 μm and a BET specific surface area of about 4 to 10 $m^2/g$.

Next the dry pulverized powder is generally subject to wet pulverization. Wet pulverization is continued until a BET specific surface area is increased about 1 to 4 times, especially about 1 to 3 times, whereby the powder has a mean particle size of about 0.1 to 0.8 μm and a BET specific surface area of about 6 to 12 $m^2/g$. This wet pulverization also increases crystal strains and the final ferrite particles are adjusted to the above-mentioned value of Hc at a strain amount of at least $10^{-4}$. Since such a strain amount and Hc can be achieved solely by wet pulverization with the dry pulverization omitted, pulverization may be wet pulverization alone. Inversely only dry pulverization may be used. At the end of pulverization, the powder has σs of about 50 to 67 emu/g. For such wet pulverization, ball mills, attritors and vibratory mills are preferably used.

The solvent used in wet pulverization may be an aqueous solvent such as water although the present invention favors use of a non-aqueous solvent as a slurry medium during wet pulverization. The non-aqueous solvents used herein are organic compounds which are liquid at room temperature, typically organic solvents. The solvents which can be used herein include hydrocarbons, for example, heptane, industrial gasoline, kerosine, cyclohexane, toluene, xylene, ethylbenzene, and turpentine oil;

halogenated hydrocarbons, for example, 1,2-dibromoethane, tetrachloroethylene, perchloroethylene, dichloropentane, and monochlorobenzene;

monohydric alcohols, phenols and ethers, for example, methanol, ethanol, n-propyl alcohol, n-butyl alcohol, cyclohexanol, phenol, and n-butyl ether;

acids and esters, for example, butyl acetate;

polyhydric alcohols and ethers and esters thereof, for example, ethylene glycol;

aldehydes, acetals and ketones, for example, acetone, methyl ethyl ketone, methyl isobutyl ketone, and cyclohexanone;

silicone fluids, for example, low viscosity silicone fluid;

nitrogenous compounds, for example, ethylene diamine;

sulfur compounds, for example, carbon disulfide; and paint thinners, for example, lacquer thinners, and mixtures thereof. The non-aqueous solvent alone or a mixture of such solvents preferably has a viscosity of 0.3 to 3 cps at 20° C., more preferably 0.3 to 2.0 cps at 20° C., especially 0.4 to 1.5 cps at 20° C. because ease of compaction and the degree of orientation of a compact are significantly improved. Preferably the non-aqueous solvent has a vapor pressure of 0.1 to 200 mmHg at 20° C., more preferably 1 to 200 mmHg at 20° C. and a boiling point of 50° to 300° C., more preferably 50° to 200° C. Also during wet pulverization, the non-aqueous solvent should preferably occupy about 10 to 90% by weight of the slurry while the amount of ferrite particles in the slurry is 10 to 90% by weight.

In such wet pulverization, at least one surfactant is preferably added to the slurry. The amount of surfactant added is preferably 0.1 to 5.0% by weight, especially 0.3 to 3.0% by weight based on the source powder. The surfactant is generally amphiphatic in that it can adsorb to the surface of ferrite particles or source powder in the slurry and in adsorbed state, be solubilized in the non-aqueous solvent. Namely, the surfactant generally has a hydrophilic group which can adsorb to the surface of ferrite particles and a lipophilic (or hydrophobic) group which is soluble in the non-aqueous solvent used. It is preferred that the solubility parameter (SP) of the surfactant used is close to the solubility parameter (SP) of the non-aqueous solvent used., It is also preferred that substantially the entire amount of the surfactant added adsorbs to the source powder in the slurry. Such adsorption and solubilization cause micelle formation so that primary particles effectively disperse in the slurry after wet pulverization so that a significant improvement in degree of orientation is achieved upon wet compaction in a magnetic field.

The surfactants used herein include cationic, anionic, non-ionic and ampholytic ones although the preferred surfactant contains at least one of saturated or unsaturated fatty acids having 4 to about 30 carbon atoms or salts thereof, for example, carboxylic acids and salts thereof such as stearic acid, oleic acid, zinc stearate, calcium stearate, strontium stearate, barium stearate, magnesium stearate, aluminum stearate, zinc oleate, calcium oleate, strontium oleate, barium oleate, magnesium oleate, aluminum oleate, and ammonium oleate. Among these, use of calcium salts of fatty acids, especially stearic acid is advantageous because solvent removal during compaction is improved to prevent cracks from occurring in the compact without detracting from a degree of orientation. This is probably because the density of a compact decreases from 3.0 $g/cm^3$ to 2.8 $g/cm^3$ to facilitate solvent removal. Also it is possible that an effective additive element which can be added to ferrite, such as Ca, Ba, Sr, Al, Cr, Ga, Cu, Zn, Fin, Co, and Ti be highly dispersed around ferrite particles by adding an organic material containing such an element (for example, metal salts of organic surfactants such as metal salts of fatty acids). Additionally, there may be used at least one of well-known sulfonic acids and salts thereof; sulfate esters and salts; phosphate esters and salts; aliphatic amine salts or quaternary ammonium salts; aromatic quaternary ammonium salts; pyridinium salts; imidazolinium salts; betaine; aminocarboxylic salts; imidazoline derivatives; and natural surfactants.

When such a surfactant is added to the non-aqueous solvent slurry containing the calcined powder and wet pulverization is performed, the resulting slurry can be directly used for wet compaction. Alternatively, part or the entirety of the surfactant may be added during dry pulverization of the calcined powder which is carried out prior to wet pulverization or alone. Also part or the entirety of the surfactant may be added after wet pulverization of the non-aqueous solvent slurry. Moreover, after dry pulverization, the surfactant and the non-aqueous solvent may be added to prepare a slurry which is subject to wet compaction. Since the surfactant is present in the slurry during its wet compaction in a magnetic field, all these procedures offer an advantage of improving the degree of orientation of a compact. It is noted that the amounts of the surfactant added at plural stages may be determined so that the above-mentioned amount of surfactant added is eventually available in the slurry for wet compaction.

When an aqueous solvent is used for wet pulverization, especially when water or a mixed solvent of water is used from the handling point of view, the source powder occupies about 10 to 70% by weight of the slurry during wet pulverization. However, since no improvement in degree of orientation of a compact is expectable when the water slurry having a surfactant added is subject to wet compaction, solvent replacement from water to a non-aqueous solvent is preferably carried out. The solvent replacement is carried out by subjecting the slurry to decantation with the source powder being magnetically supported. It is noted that this wet compaction may be preceded by dry pulverization.

In this embodiment where wet pulverization using a solvent, preferably aqueous, different from the slurry solvent to be used during wet compaction is followed by solvent replacement, the surfactant should be present in the above-mentioned amount prior to the final wet compaction. To this end, the surfactant may be added at any one of the stages of dry pulverization, wet pulverization, and final slurry preparation. In any case, the final slurry for wet compaction is adjusted to a non-aqueous solvent content of about 5 to 30% by weight and a source particle content of about 70 to 95% by weight.

After the final non-aqueous solvent slurry containing the surfactant is prepared in this way, it is wet compacted in a magnetic field while removing the non-aqueous solvent from the slurry. Solvent removal may be carried out in a conventional manner, for example, by forced removal under vacuum. The compacting pressure is about 0.1 to 0.5 ton/cm² and the magnetic field applied is about 5 to 15 kG. The resulting compact has a degree of orientation $I_r/I_s$ of at least 75%, typically 78 to 86%. Such a high degree of orientation is accomplished only when the non-aqueous solvent and the surfactant are used in combination, but not when the surfactant is added to a water slurry.

Thereafter, the compact is heat treated in air or nitrogen at a temperature of 100° to 500° C. to burn out or decompose away the added surfactant. Then the compact is sintered, for example, in air at a temperature of 1,150° to 1,250° C., especially 1,160° to 1,220° C. for about ½ to 3 hours, obtaining a hexagonal barium ferrite sintered magnet of any desired shape according to the invention.

Alternatively, the compact is disintegrated by a crusher or the like and sieved to collect a fraction of particles having a mean particle size of 100 to 700 μm suitable for magnetic field orientation. The particles are then dry compacted under a magnetic field and similarly sintered, obtaining a hexagonal barium ferrite sintered magnet of any desired shape according to the invention.

Also, in the manufacturing method of the present invention, only introduction of mechanical strains can be carried out by pulverization without using the surfactant. In this embodiment, pulverization may be either dry or wet pulverization as mentioned above. In the preferred embodiment wherein wet pulverization is carried out, water or a mixed solvent of water is preferred as the slurry solvent because of ease of handling. On wet pulverization, the solvent preferably occupies about 10 to 90% by weight of the slurry, especially about 30 to 90% by weight of the water slurry, and the ferrite particles occupy about 10 to 90% by weight of the slurry, especially about 10 to 70% by weight of the water slurry.

In the preferred embodiment wherein the water or aqueous slurry is subject to wet pulverization, the slurry may then be subject to wet compaction without further treatment. Also, dry pulverization of calcined powder may be carried out prior to wet compaction as previously mentioned. Further, a solvent may be added after dry pulverization to prepare a slurry for wet compaction. Moreover, the above-mentioned wet pulverization may be carried out in another solvent different from the slurry for compaction and thereafter, the solvent used for pulverization is replaced by water prior to wet compaction. The solvent replacement is carried out, for example, by subjecting the slurry to decantation with the source powder being magnetically supported. It is noted that this wet compaction may be preceded by dry pulverization. In any case, the final slurry for wet compaction is adjusted to a water or solvent content of about 5 to 30% by weight and a source particle content of about 70 to 95% by weight.

Where the aqueous slurry is subject to wet pulverization, a dispersant is preferably added upon pulverization. The dispersant used herein is desirably a polymeric dispersant, especially a polycarboxylic acid ammonium dispersant. The dispersant is added in an amount of 0.1 to 1% by weight of the source powder.

EXAMPLE

Examples and Comparative Examples are given below to further illustrate the present invention.

Examples 1–2 & Comparative Examples 1–4

The following raw materials were used.

| | |
|---|---|
| $Fe_2O_3$ powder (primary particle size 0.3 μm) | 1000 g |
| $BaCl_2.2H_2O$ (1st grade reagent) | 321.4 g |
| $Na_2CO_3$ (extra grade reagent) | 111.6 g |

The $Fe_2O_3$ powder and $Na_2CO_3$ were milled along with 1.6 liters of water in a wet attritor for 1½ hours to form a slurry. An aqueous solution of $BaCl_2 \cdot 2H_2O$ was added dropwise to the slurry in the attritor, which was milled for a further ½ hour. During the process, very fine barium carbonate precipitated and settled through the reaction:

$$BaCl_2 + Na_2CO_3 \rightarrow BaCO_3 \downarrow + 2NaCl$$

and was mixed with iron oxide particles to high precision. The slurry was washed until NaCl was less than 0.2%, dewatered, dried, granulated, and fired in air at 1,175° C. for 3 hours, obtaining a calcined powder.

The resulting powder was measured for magnetic properties by a vibrating sample magnetometer (VSM) to find $\sigma s = 68$ emu/g and $iHc = 4.5$ kOe. An observation under a scanning electron microscope (SEM) showed a primary particle size of 0.3 μm and a BET specific surface area of 2 $m^2$/g.

To the calcined powder were added 0.6% by weight of $SiO_2$ (mean particle size 0.01 μm) and the amount shown in Table 1 of $SrCO_3$ or $CaCO_3$ (both having a mean particle size of 1 μm). The mixture was milled in a dry vibratory mill until the ferrite powder reached a specific surface area of 7 $m^2$/g. This process introduced comminution strains into the ferrite powder, causing a reduction of iHc from 4.5 kOe to 2.2 kOe.

Next, the powder was subject to wet milling in a ball mill using xylene as a non-aqueous solvent and oleic acid as a surfactant. Oleic acid was added in an amount of 1.5% by weight based on the powder resulting from the dry milling step. The xylene slurry had a ferrite concentration of 33% by weight. Milling was continued until a specific surface area of 8 $m^2$/g was reached. The powder in the thus milled slurry was similarly measured for magnetic properties to find $\sigma s = 63$ emu/g and $iHc = 2.0$ kOe. It had a mean particle size of 0.3 μm.

The milled slurry was worked up by suction filtration so that the slurry had a ferrite concentration of 80 to 85% by weight. While removing the solvent from the slurry, the powder was compacted into a cylindrical column having a diameter of 30 mm and a height of 15 mm in a magnetic field of about 13 kG applied in a height direction. The resulting compact had a degree of orientation (Ir/Is) as reported in Table 1.

Next, each compact was fired in air at the temperature shown in Table 1 for one hour. Before firing of the compact, it was fully burned out in air at 100° to 300° C. in order to remove the oleic acid. The resulting sintered body was evaluated for magnetic properties, degree of orientation, sintered density, and a shrinkage factor ratio (Shc/Sha) of shrinkage factor in height direction (c axis direction) to shrinkage factor in diametrical direction (a axis direction). The results are shown in Table 1. It is noted that $SrCO_3 = 2.3\%$ corresponds to $CaCO_3 = 1.56\%$ when calculated in molar percent.

TABLE 1

| | Amount of | | $SrCO_3$ /$SiO_2$ (molar ratio) | Amount $CaCO_3$ added (wt %) | Compact Ir/Is (%) | Sinter temp. (°C.) | Magnetic properties | | | Sintered body Ir/Is (%) | Sintered density (g/cm³) | Shrinkage factor ratio Shc/Sha |
|---|---|---|---|---|---|---|---|---|---|---|---|---|
| | $SiO_2$ added (wt %) | $SrCO_3$ added (wt %) | | | | | Br (kG) | bHc (kOe) | iHc (kOe) | | | |
| E1 | 0.6 | 2.3 | 1.6 | — | 86.0 | 1190 | 4.30 | 3.49 | 3.57 | 96.6 | 5.17 | 1.0 |
| E2 | 0.6 | 2.3 | 1.6 | — | 86.0 | 1210 | 4.32 | 3.32 | 3.41 | 96.7 | 5.19 | 0.9 |
| CE1 | 0.6 | — | — | 1.8 | 85.8 | 1190 | 4.34 | 2.86 | 2.96 | 97.9 | 5.13 | 1.5 |
| CE2 | 0.6 | — | — | 1.8 | 85.8 | 1210 | 4.42 | 2.43 | 2.47 | 98.2 | 5.17 | 1.5 |
| CE3 | 0.6 | — | — | 1.5 | 85.3 | 1190 | 4.31 | 3.22 | 3.36 | 97.7 | 5.08 | 1.7 |
| CE4 | 0.6 | — | — | 1.5 | 85.3 | 1210 | 4.37 | 2.94 | 3.07 | 98.3 | 5.11 | 1.7 |

As shown in Table 1, the samples in which $SrCO_3$ was added instead of $CaCO_3$ had improved iHc and a shrinkage factor ratio (Shc/Sha) of approximately 1. A comparison of Example 1 with Comparative Example 3 and a comparison of Example 2 with Comparative Example 4, in which the addition amount is equivalent in molar percent and the firing temperature is equal, show that the sintered density is improved by adding $SrCO_3$ instead of $CaCO_3$.

Examples 3–5

The following raw materials were used.

| | primary particle size | |
|---|---|---|
| $Fe_2O_3$ powder | 0.3 μm | 1000 g |
| $BaCO_3$ powder | 2 μm | 215.5 g |
| $SiO_2$ | 0.01 μm | 2.30 g |
| $CaCO_3$ | 1 μm | 1.72 g |

A mixture of the above composition was milled along with 2 liters of water in a wet attritor for 2 hours, dried, granulated, and fired in air at 1,175° C. for 3 hours, obtaining a calcined powder.

The resulting powder was measured for magnetic properties by a vibrating sample magnetometer (VSM) to find $\sigma s = 68$ emu/g and $iHc = 4.3$ kOe. It had a primary particle size of 0.5 μm and a BET specific surface area of 2 $m^2$/g.

To the calcined powder were added 0.6% by weight of $SiO_2$ and a predetermined amount of $SrCO_3$ or 1.5% by weight of $CaCO_3$. The mixture was milled in a dry vibratory mill until the ferrite powder reached a specific surface area of 7 $m^2$/g. This process introduced comminution strains into the ferrite powder, causing a reduction of iHc from 4.3 kOe to 1.9 kOe. Note that the samples having $SrCO_3$ added thereto had a $SrCO_3$/$SiO_2$ molar ratio in the range between 0.5 and 3.

Next, the powder was subject to wet milling in a ball mill using xylene as a non-aqueous solvent and oleic acid as a surfactant. Oleic acid was added in an amount of 1.3% by weight based on the powder resulting from the dry milling step. The xylene slurry had a ferrite concentration of 33% by weight. Milling was continued until a specific surface area of 8 m$^2$/g was reached. The powder in the thus milled slurry was similarly measured for magnetic properties to find σs=63 emu/g and iHc=1.6 kOe. It had a mean particle size of 0.3 μm.

The milled slurry was worked up by suction filtration so that the slurry had a ferrite concentration of 80 to 85% by weight. While removing the solvent from the slurry, the powder was compacted into a cylindrical column having a diameter of 30 mm and a height of 15 mm in a magnetic field of about 13 kG applied in a height direction.

Next, each compact was fired in air at 1,190° to 1,220° C. for one hour while the heating and cooling rates were 5° C./min. Before firing of the compact, it was fully burned out in air at 100° to 300° C. in order to remove the oleic acid. The resulting sintered body was evaluated for shrinkage factors (Shc and Sha), shrinkage factor ratio (Shc/Sha), magnetic properties, and dependency of shrinkage factor ratio (Shc/Sha) on sintering temperature. The results are shown in FIGS. 1, 2 and 3.

Figure 1:
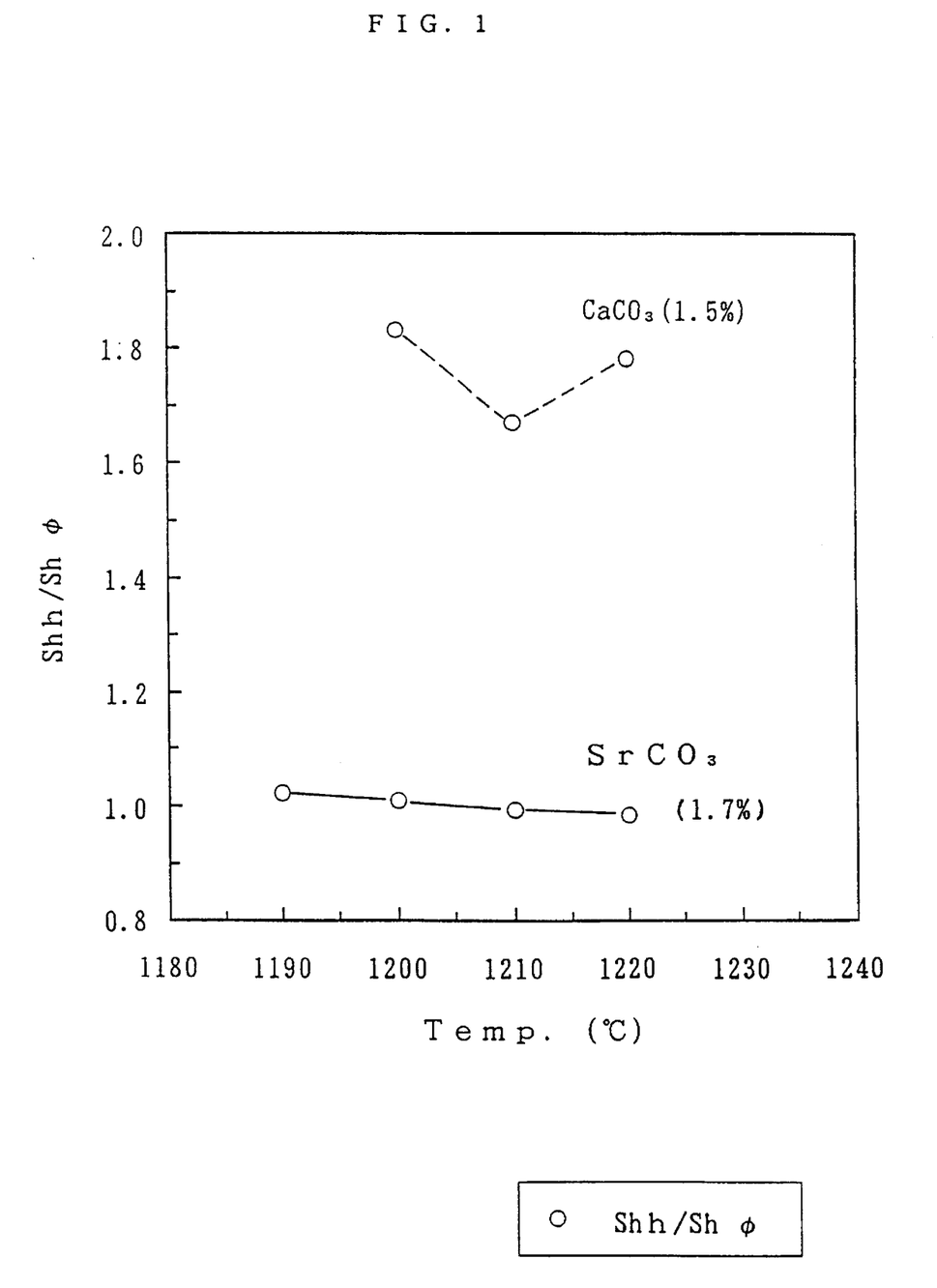
FIG. 1 is a graph showing the shrinkage factor ratio versus sintering temperature of inventive and comparative hexagonal barium ferrite sintered magnets.
Figure 2A:
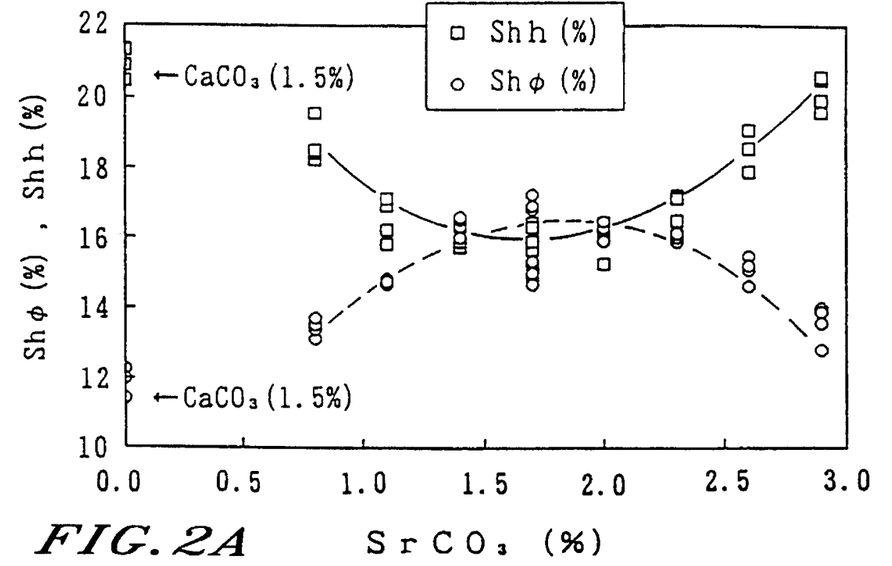
Figure 2B:
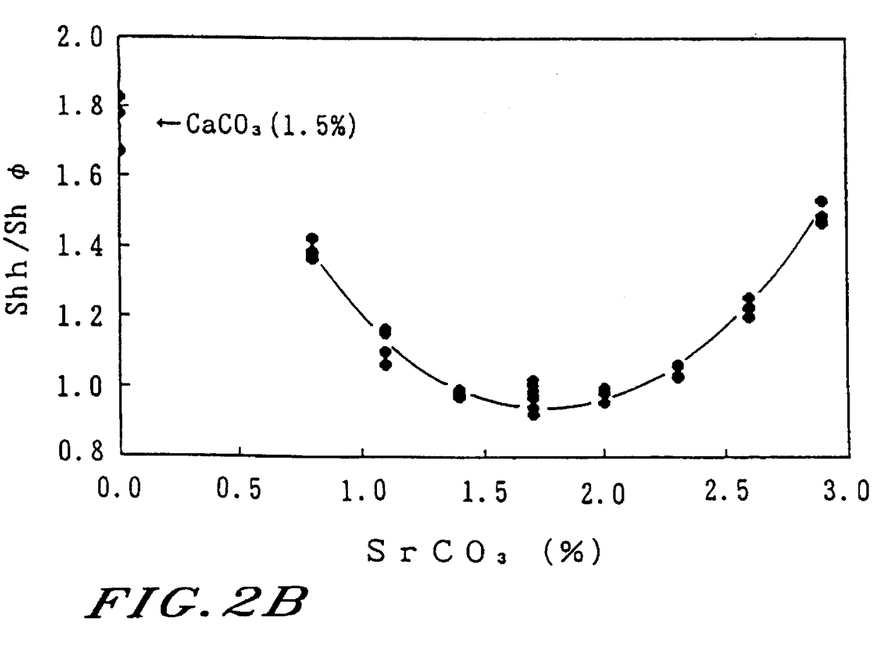
Figure 3:
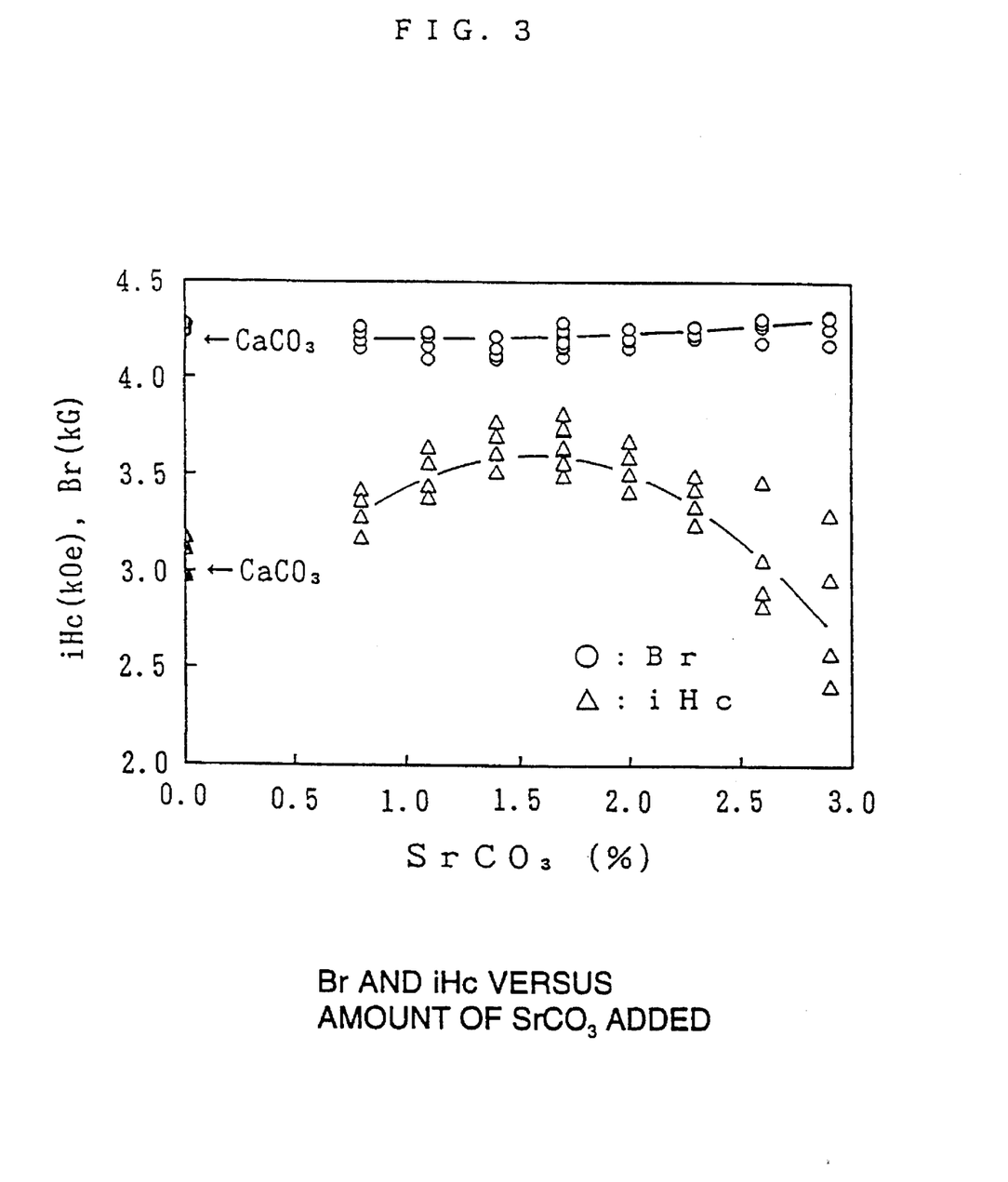
FIG. 3 is a graph showing the iHc and Br versus the amount of $SrCO_3$ added of inventive and comparative hexagonal barium ferrite sintered magnets.
Figure 5A:
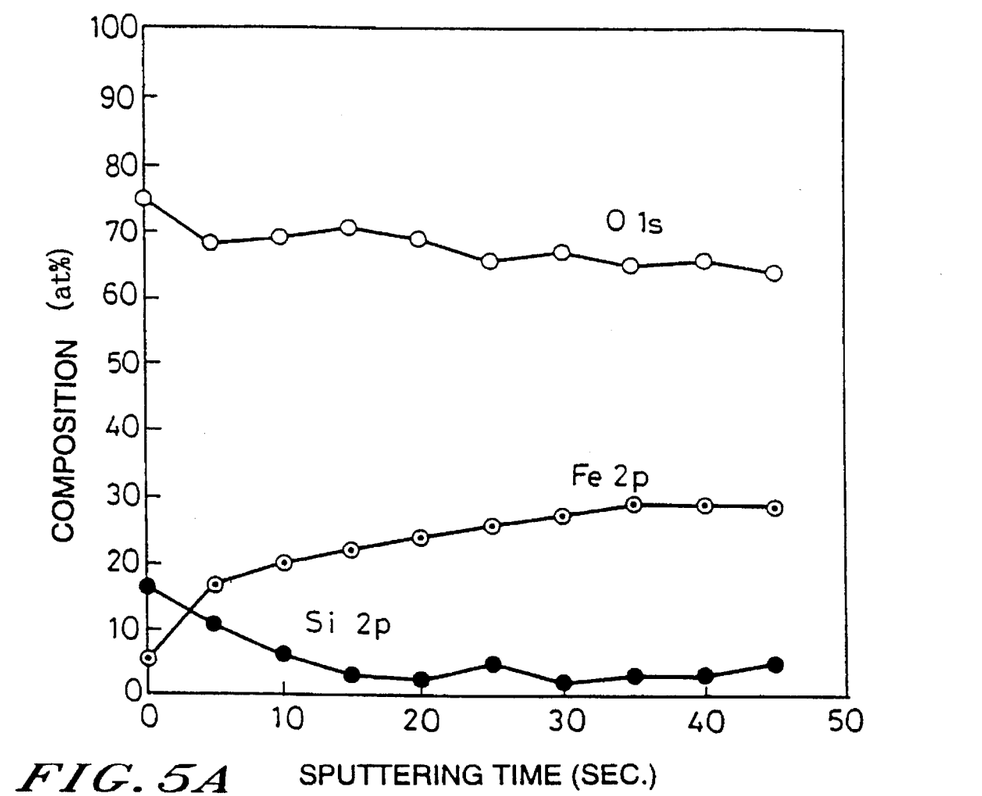
FIG. 5(a) and 5(b) are graphs showing the results of analysis by ESCA in depth direction on a ferrite fracture surface of inventive hexagonal barium ferrite sintered magnet having 1.7 wt % of $SrCO_3$ added thereto.
Figure 5B:
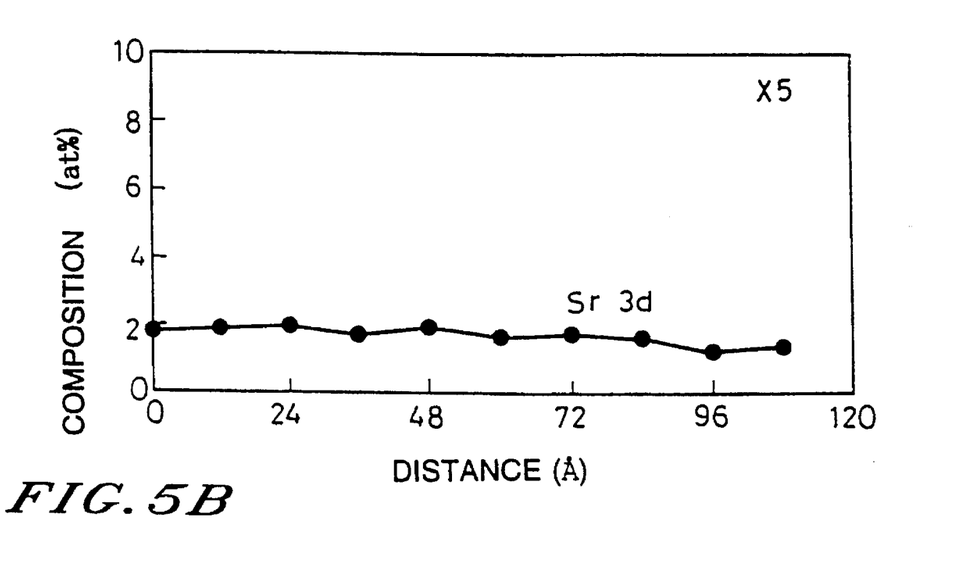

The samples having SrCO$_3$ added thereto exhibited a lower Shh, but a higher Shφ than the samples with CaCO$_3$ added, and had a shrinkage factor of about 16% in either direction, resulting in Shh/Shφ approximating to 1 as shown in FIGS. 1 and 2. Also FIG. 3 shows that the samples with FIG. 5 is a graph showing the results of analysis by ESCA in a depth direction on a ferrite fracture surface of a sintered sample with 0.6% by weight of SiO$_2$ and 1.7% by weight of SrCO$_3$ added. Milling in a depth direction was performed by means of a Kaufmann type ion gun (0.5 kV/30 mA) and the sputtering rate was 144 Å/min. calculated as SiO$_2$. The results of analysis by ESCA are shown in Table 2. Note that $C_{1o}$ was 5 to 20 at %.

TABLE 2

|  | Amount of SiO$_2$ added (wt %) | Amount of SrCO$_3$ added (wt %) | Sintering temp. (°C.) | Grain boundary phase | |
| --- | --- | --- | --- | --- | --- |
|  |  |  |  | Si $C_{1o}/C_{1i}$ | Sr $C_{2o}/C_{2i}$ |
| Example 3 | 0.6 | 1.7 | 1200 | 5.5 | 2.1 |
| Example 4 | 0.6 | 2.9 | 1200 | 6.0 | 2.0 |
| Example 5 | 0.6 | 0.8 | 1200 | 4.7 | 1.8 |

Analysis by TEM-EDS

Comparative Example 5

A compact was prepared by the same procedure as Examples 3 to 5 except that 0.6% by weight of SiO$_2$ and 1.5% by weight of CaCO$_3$ were added. It was fired in air at 1,210° C. for one hour, obtaining a sintered sample. The attributes of the compact and sintered sample are shown in Table 3.

TABLE 3

|  | Amount of | | SrCO$_3$ /SiO$_2$ (molar ratio) | Amount CaCO$_3$ added (wt %) | Compact Ir/Is (%) | Sinter temp. (°C.) | Magnetic properties | | | Sintered body Ir/Is (%) | Sintered density (g/cm$^3$) | Shrinkage factor ratio Shc/Sha |
| --- | --- | --- | --- | --- | --- | --- | --- | --- | --- | --- | --- | --- |
|  | SiO$_2$ added (wt %) | SrCO$_3$ added (wt %) | | | | | Br (kG) | bHc (kOe) | iHc (kOe) | | | |
| CE5 | 0.6 | — | — | 1.5 | 86.4 | 1210 | 4.25 | 3.01 | 3.12 | 97.9 | 5.00 | 1.7 |

SrCO$_3$ added had equivalent Br, but high iHc as compared with the samples with CaCO$_3$ added, offering improved magnetic properties. The samples with SrCO$_3$ added had equivalent or higher sintered density as compared with the samples with CaCO$_3$ added, and had little dependency of shrinkage factor ratio (Shh/Shφ) on sintering temperature.

Figure 4A:
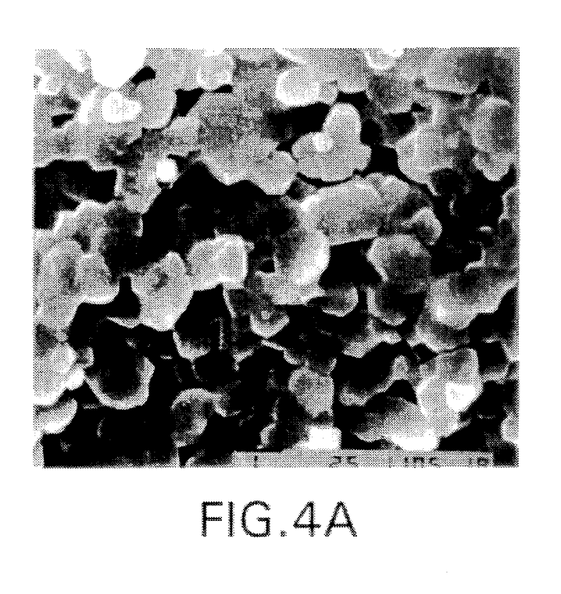
FIG. 4(a) and (b) are figure-substituting photographs taken through a Scanning electron microscope showing the crystal structure of inventive and comparative hexagonal barium ferrite sintered magnets (photos a and b).
Figure 4B:
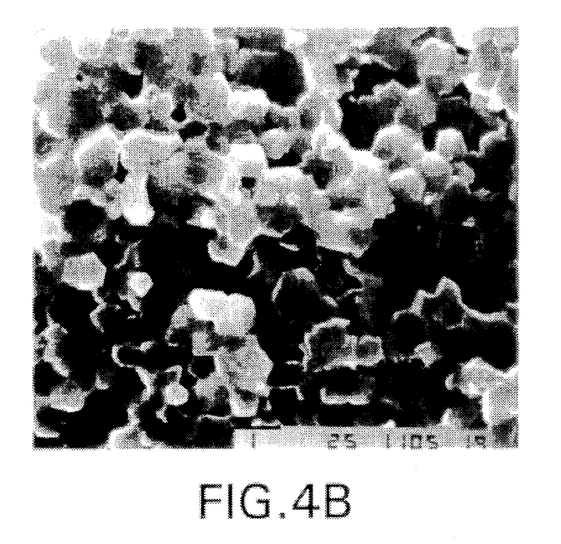

FIGS. 4(a) and 4(b) are SEM photographs showing the structure of a sintered sample with 0.6% by weight of SiO$_2$ and 1.5% by weight of CaCO$_3$ added and a sintered sample with 0.6% by weight of SiO$_2$ and 1.7% by weight of SrCO$_3$ added, respectively. Photo (b) of the inventive sample shows grains of a controlled smaller size.

The sintered samples of Comparative Example 5 and Example 3 were ground from opposite surfaces in a direction parallel to c axis to a thickness of about 100 μm, further ground to a thickness of about 30 μm by means of a Dimple-Grinder, and worked into a thin film by means of a precision Ar ion polishing system (PIPS), obtaining test samples. Each test sample was determined by TEM-EDS for composition distribution of its multi-grain boundary and grain interior at four or more sites (N≧4). JEM2000FXII manufactured by Nihon Denshi K.K. was used for TEM and TN5450 by Tractor-Northern was used for EDS. The results are shown in Table 4.

TABLE 4

| | | | Si | Ca | Ba | Sr | Fe | Mn | Al | Cr | O |
|---|---|---|---|---|---|---|---|---|---|---|---|
| | | Results of measurement by TEM-EDS | | | | | | | | | |
| Comparative Example 5 | Grain (at %) N = 7 | average | 0.3 | 0.1 | 4.5 | 0.2 | 35.5 | 0.1 | 0.2 | 0.1 | 59.1 |
| | | σ | 0.2 | 0.1 | 0.3 | 0.1 | 0.5 | 0.1 | 0.1 | 0.1 | 0.1 |
| | Grain boundary (at %) N = 4 | average | 14.1 | 5.6 | 4.0 | 0.2 | 14.9 | 0.1 | 0.1 | 0.1 | 60.7 |
| | | σ | 4.0 | 1.1 | 0.5 | 0.1 | 5.1 | 0.1 | 0.1 | 0.1 | 0.8 |
| | Boundary/grain | | 51 | 39 | 0.9 | 1.0 | 0.4 | — | — | — | — |
| Example 3 | Grain (at %) N = 5 | average | 0.3 | 0.1 | 4.3 | 0.3 | 35.3 | 0.1 | 0.3 | 0.2 | 59.1 |
| | | σ | 0.2 | 0.1 | 0.2 | 0.1 | 0.3 | 0.1 | 0.2 | 0.2 | 0.1 |
| | Grain boundary (at %) N = 4 | average | 15.2 | 1.1 | 8.3 | 2.2 | 11.8 | 0.1 | 0.3 | 0.3 | 60.8 |
| | | σ | 5.3 | 0.2 | 1.6 | 0.6 | 7.4 | 0.1 | 0.3 | 0.2 | 0.7 |
| | Boundary/grain | | 46 | 8 | 1.9 | 8 | 0.3 | — | — | — | — |

It seen from Table 4 that Si, Sr and Ba are present as grain boundary components in the inventive sample. In the sample of Comparative Example 5 wherein Sr is not added, Sr and Ba are present at the grain boundary, but their concentrations at the grain boundary are equal to those within grains.

Example 6

A compact was shaped under a magnetic field by the same procedure as in Example 3 except that 2.0% by weight of $SrCO_3$ was added to the calcined powder. The compact was burned out at 240° C. for 3 hours, ground and sieved to collect a 60-mesh fraction (sieve size 250 μm), obtaining granules to be subject to magnetic field orientation. The granules were shaped under a magnetic field and thereafter, sintered at 1,220° C. for one hour, obtaining a 24-pole polar anisotropy ring magnet having an outer diameter of 31 mm, an inner diameter of 23 mm and a height of 19 mm.

The polar anisotropy ring magnet after firing was evaluated for a degree of deformation by a round tester. The results are shown in FIG. 6(a).

Comparative Example 6

A polar anisotropy ring magnet was manufactured by the same procedure as Example 6 except that $SrCO_3$ was replaced by 1.5% by weight of $CaCO_3$. The results are shown in FIG. 6(b).

Figure 6A:
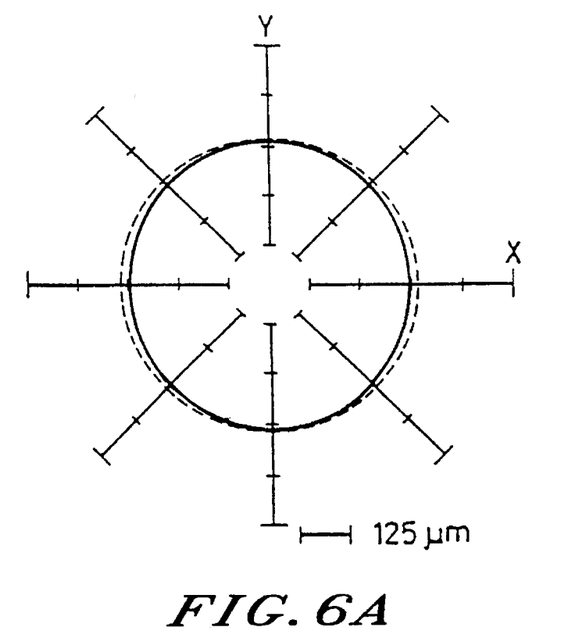
FIG. 6 schematically illustrates the degree of deformation of inventive and comparative polar anisotropy ring magnets (a and b) after sintering.
Figure 6B:
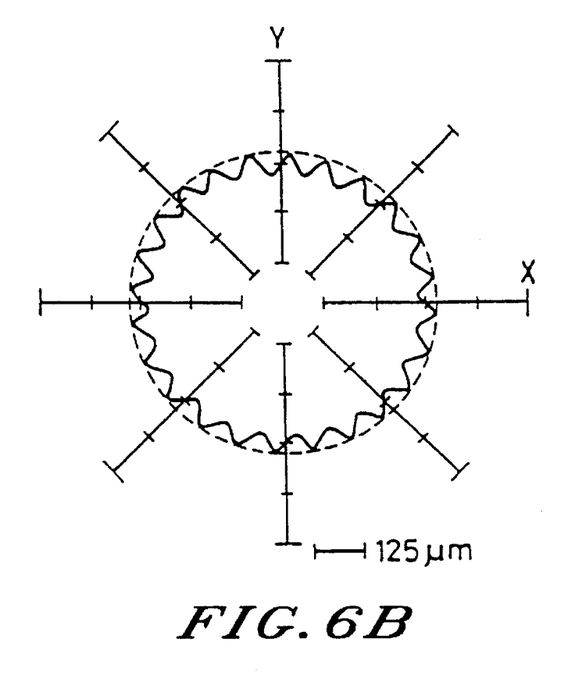

A comparison of FIGS. 6(a) and 6(b) indicates that the polar anisotropy ring magnet of the invention experienced less deformation, enabling a saving of polishing allowance. It is noted that the ring magnets of Example 6 and Comparative Example 6 had equivalent magnetic properties (surface magnetic flux density). Also Examples 1, 2 and 6 had equivalent values of $C_{1o}$, $C_{1o}/C_{1i}$, and $C_{2o}/C_{2i}$ to Examples 3, 4, and 5.

Comparative Examples 7–9 (Sr ferrite magnets)

A calcined powder of Sr ferrite was prepared by the same procedure as Examples 3–5 except that 161.2 g of $SrCO_3$ was used instead of 215.5 g of $BaCO_3$. To the calcined powder were added $SiO_2$ and $CaCO_3$, $BaCO_3$ or $SrCO_3$ as shown in Table 5. Except for this point, sintered bodies were prepared as in Examples 3–5. The sintered bodies were measured for shrinkage factor ratio. The results are shown in Table 5.

TABLE 5

| | Sr ferrite | | | | Shrinkage factor ratio (Shc/Sha) |
|---|---|---|---|---|---|
| | Additive (wt %) | | | | |
| | $SiO_2$ | $CaCO_3$ | $BaCO_3$ | $SrCO_3$ | |
| CE 7 | 0.6 | 1.4 | — | — | 1.6 |
| CE 8 | 0.6 | — | 2.76 | — | 1.7 |
| CE 9 | 0.6 | — | — | 1.85 | 1.7 |

It is evident from Table 5 that the combined addition of Si+Sr is not effective to Sr ferrite sintered magnets.

We claim:

1. A hexagonal barium ferrite sintered magnet comprising barium ferrite as a primary phase and containing strontium and silicon as grain boundary components, wherein said sintered magnet has an iHc of at least 2.5 kOe and Br of at least 4.1 kG.

2. The hexagonal barium ferrite sintered magnet of claim 1 wherein the grain boundary has a silicon content of 2 to 50 at %.

3. The hexagonal barium ferrite sintered magnet of claim 1 wherein the grain boundary has a strontium content of 0.5 to 10 at %.

4. The hexagonal barium ferrite sintered magnet of claim 1 wherein the grain boundary has a silicon content which is 2 to 100 times the silicon content within primary phase grains.

5. The hexagonal barium ferrite sintered magnet of claim 1 wherein the grain boundary has a strontium content which is 1.1 to 20 times the strontium content within primary phase grains.

6. The hexagonal barium ferrite sintered magnet of claim 1 which contains barium as a grain boundary component, the grain boundary has a barium content which is 1.1 to 20 times the barium content within primary phase grains.

7. The hexagonal barium ferrite sintered magnet of claim 1 wherein the primary phase has a mean grain size of up to 1.0 μm.

8. A method for preparing a hexagonal barium ferrite sintered magnet comprising the steps of pulverizing a calcined powder of hexagonal barium ferrite, compacting the thus pulverized barium ferrite source particles in a magnetic field to form a compact, and sintering the compact, wherein said compact comprises a silicon component in the form of silicon oxide or a compound capable of converting into silicon oxide upon firing and a strontium component in the form of strontium oxide or a compound capable of converting into strontium oxide upon firing, and shc/sha is from 0.8 to less than 1.5.

9. A method for preparing a hexagonal barium ferrite sintered magnet according to claim 8 wherein said silicon component and said strontium component are contained such that the amount of said silicon component is 0.1 to 2.0% by weight calculated as $SiO_2$ and the amount of said strontium component is 0.5 to 5% by weight calculated as $SrCO_3$, both based on the barium ferrite source particles, the molar ratio of $SrCO_3/SiO_2$ being from 0.5 to 3.

10. A method for preparing a hexagonal barium ferrite sintered magnet according to claim 8 wherein said silicon component and said strontium component are added together in the pulverizing step.

11. A method for preparing a hexagonal barium ferrite sintered magnet according to claim 8 wherein said barium ferrite source particles have a mean particle size of up to 1 μm.

12. A method for preparing a hexagonal barium ferrite sintered magnet comprising the steps of disintegrating the compact of claim 8, compacting in a magnetic field and sintering.

13. A method for preparing a hexagonal barium ferrite sintered magnet according to claim 8 wherein the sintering step causes barium to precipitate at a grain boundary.

14. A method for preparing a hexagonal barium ferrite sintered magnet according to claim 8 wherein the hexagonal barium ferrite sintered magnet comprises barium ferrite as a primary phase and containing strontium and silicon as grain boundary components.

15. A polar anisotropy ring magnet comprising the hexagonal barium ferrite sintered magnet of claim 1 which is shaped into a ring having an inner or outer peripheral surface which is oriented in multiple poles.

16. The hexagonal barium ferrite sintered magnet of claim 1, wherein said sintered magnet has an iHc of greater than 3.4 kOe.

17. The method of claim 8, wherein shc/sha is from 0.9 to 1.2.

18. The method of claim 8, wherein said strontium component is strontium carbonate.

* * * * *